April 11, 1961
E. C. MAKIN, JR
2,979,545
EXTRACTIVE DISTILLATION
Filed Oct. 31, 1958
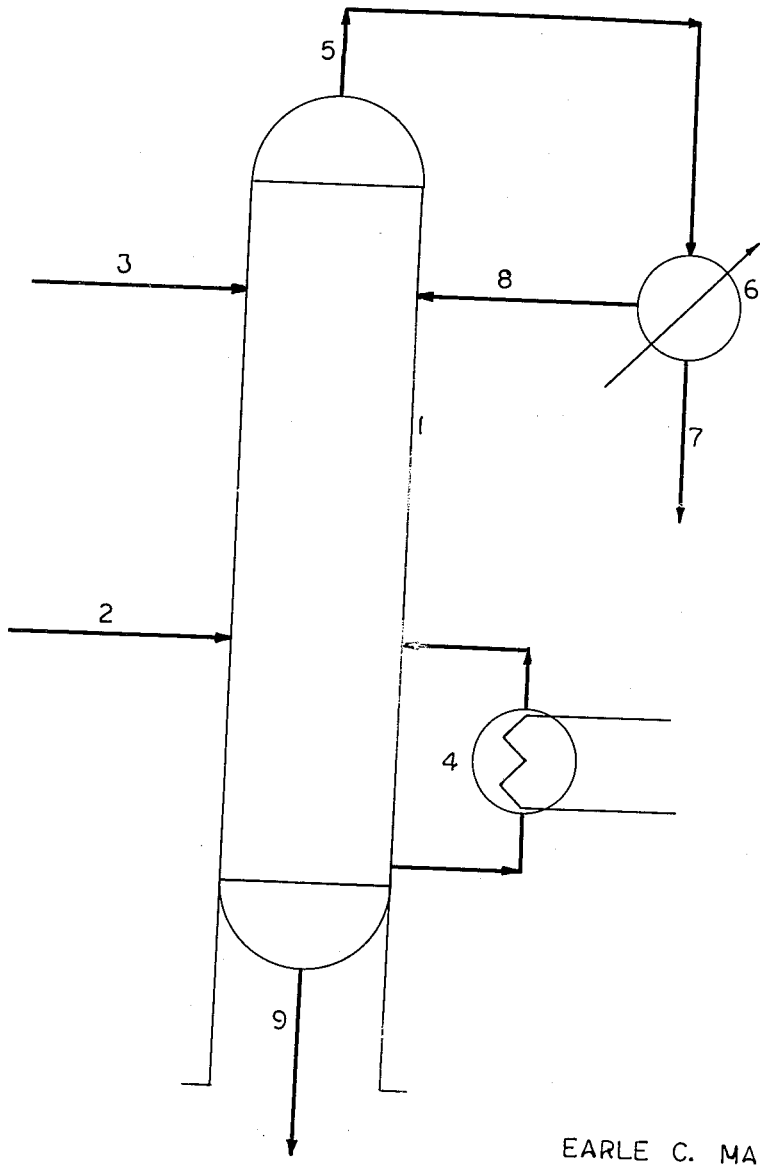
EARLE C. MAKIN JR.
*INVENTOR.*
ATTORNEY

United States Patent Office

2,979,545
Patented Apr. 11, 1961

---

2,979,545
EXTRACTIVE DISTILLATION

Earle C. Makin, Jr., El Dorado, Ark., assignor to Monsanto Chemical Company, St. Louis, Mo., a corporation of Delaware Filed Oct. 31, 1958, Ser. No. 770,974

8 Claims. (Cl. 260—666)

This invention relates to the separation of mixtures of hydrocarbons and more particularly to the separation of mixtures of acyclic and cyclic hydrocarbons containing six carbon atoms.

Aromatic hydrocarbons can be prepared by the dehydrocyclization of aliphatic hydrocarbons containing six carbon atoms. Petroleum refinery streams can be treated or processed to produce a mixture of hydrocarbons containing six carbon atoms. Such a mixture, when obtained by conventional operations, contains acyclic, alicyclic and aromatic hydrocarbons. In order to efficiently dehydrocyclize the $C_6$ acyclic hydrocarbons to aromatics it is necessary that the alicyclic substituents of the hydrocarbon mixture be removed. Due to the closeness of the boiling points of the various isomeric $C_6$ hydrocarbons present in such mixtures obtained by the more conventional methods of operation, such a separation is most difficult.

It is an object of this invention to provide an improved method for the separation of cyclic hydrocarbons from a hydrocarbon mixture consisting essentially of acyclic and cyclic hydrocarbons each containing six carbon atoms. Additional objects will become apparent from the description of the invention.

It has now been discovered that cyclic hydrocarbons contained in a feed mixture consisting essentially of acyclic and cyclic hydrocarbons each containing six carbon atoms can be effectively separated from said feed mixture by an extractive distillation process which comprises continuously introducing said feed mixture into an intermediate section of a fractionating column, continuously introducing an alkyl ether of aniline into said fractionating column at a point above the point of introduction of said feed mixture so that said alkyl ether of aniline flows countercurrent to and intimately contacts the ascending vapors of said feed mixture, withdrawing overhead a mixture of acyclic hydrocarbons substantially free of cyclic hydrocarbons and removing from the bottom section of said column a solution of cyclic hydrocarbons contained in the alkyl ether of aniline.

The invention may be illustrated by reference to the single figure in which an embodiment of the invention is schematically represented. A feed mixture of hydrocarbons to be separated is introduced into fractionating column 1 through line 2. The liquid in the lower part of the column is vaporized by heat supplied by reboiler 4. The solvent is introduced in the liquid phase at the top of the column through line 3 and flows down the column countercurrent to the rising vapors. The vapors passing upwardly through the descending solvent are withdrawn overheat through line 5, passing through condenser 6 where they are liquified, a portion returned to the column through line 8 as reflux and a portion recovered through line 7 for further use and/or processing. The solvent having dissolved therein cyclic hydrocarbons is removed from the column through line 9 and the cyclic hydrocarbons recovered if desired.

The following examples are specific illustrations of the novel process of this invention:

*Example I*

In order to effect the separation of hydrocarbons in accordance with the process of this invention a fractionating column containing 60 perforated trays was employed. The hydrocarbon feed mixture had the following composition:

| Hydrocarbon: | Volume percent |
|---|---|
| 2-methylpentane | 1.3 |
| 3-methylpentane | 3.9 |
| n-Hexane | 64.9 |
| Methylcyclopentane | 23.9 |
| Benzene | 5.3 |
| 2,4-dimethylpentane | 0.7 |

This hydrocarbon feed mixture was introduced on the 21st tray. A pot temperature of 139.0–139.5° C. was maintained. The solvent, o-ethoxyaniline, was introduced on the top tray of the column at a temperature of 90.5–91.8° C. The column was operated on a continuous basis maintaining a volume ratio of solvent:oil of 6.60:1.0. A 5:1 reflux ratio was maintained. The distillate obtained represents 68 volume percent of the feed mixture. The distillate had the following composition:

| Hydrocarbon: | Volume percent |
|---|---|
| 2-methylpentane | 3.0 |
| 3-methylpentane | 9.2 |
| n-Hexane | 87.6 |
| Methylcyclopentane | 0.8 |
| Benzene | None |
| 2,4-dimethylpentane | Trace |

*Example II*

The apparatus described in Example I was used to effect a separation of the hydrocarbons contained in the following feed mixture:

| Hydrocarbon: | Volume percent |
|---|---|
| 2-methylpentane | 7.1 |
| 3-methylpentane | 10.1 |
| n-Hexane | 49.5 |
| Methylcyclopentane | 14.1 |
| Cyclohexane | 15.2 |
| Benzene | 3.5 |
| 2,4-dimethylpentane | 0.5 |

The hydrocarbon feed mixture was introduced into the column on the 21st tray and the solvent was introduced on the top tray. The solvent was o-ethoxyaniline. The solvent feed temperature was 92.0–93.8° C. and a pot temperature of 143.0–144.0° C. was maintained. The volume ratio of solvent:oil was 5.1:1.0. The column was operated on a continuous basis at a reflux ratio of 5:1. The distillate, representing 59 volume percent of the feed, had the following composition:

| Hydrocarbon: | Volume percent |
|---|---|
| 2-methylpentane | 11.4 |
| 3-methylpentane | 18.3 |
| n-Hexane | 68.6 |
| Methylcyclopentane | 0.6 |
| Cyclohexane | None |
| Benzene | None |
| 2,4-dimethylpentane | 1.1 |

*Example III*

The procedure set forth in Example I is repeated using the same hydrocarbon feed mixture specified therein and using the solvent o-methoxyaniline. The overhead stream obtained is substantially free of cyclic hydrocarbons.

Example IV

The procedure set forth in Example I is repeated using the same hydrocarbon feed mixture as specified therein and using as the solvent o-propoxyaniline. The overhead stream obtained is substantially free of cyclic hydrocarbons.

Example V

The procedure set forth in Example I is repeated using the same hydrocarbon mixture specified therein and using as the solvent p-n-butoxyaniline. The overhead stream thus obtained is substantially free of cyclic hydrocarbons.

Example VI

The procedure set forth in Example I is repeated using the same hydrocarbon mixture specified therein and using as the solvent o-2-methylpentoxyaniline. The overhead stream thus obtained is substantially free of cyclic hydrocarbons.

Although any liquid monoalkyl ether of aniline can be used in the novel process of this invention, the liquid monoalkyl ethers aniline wherein the alkyl group contains of from 1 to 8 carbon atoms are particularly preferred. The following alkly ethers of aniline are specific examples of those that can be used in the process of this invention:

| | |
|---|---|
| o-Methoxyaniline | o-n-Pentoxyaniline |
| m-Methoxyaniline | m-n-Pentoxyaniline |
| p-Methoxyaniline | p-n-Pentoxyaniline |
| o-Ethoxyaniline | o-Isopentoxyaniline |
| m-Ethoxyaniline | m-Isopentoxyaniline |
| p-Ethoxyaniline | p-Isopentoxyaniline |
| o-Propoxyaniline | o-n-Hexoxyaniline |
| m-Propoxyaniline | m-n-Hexoxyaniline |
| p-Propoxyaniline | p-n-Hexoxyaniline |
| o-Isopropoxyaniline | o-2-methylpentoxyaniline |
| m-Isopropoxyaniline | m-2-methylpentoxyaniline |
| p-Isopropoxyaniline | p-2-methylpentoxyaniline |
| o-n-Butoxyaniline | o-n-Heptoxyaniline |
| m-n-Butoxyaniline | m-n-Heptoxyaniline |
| p-n-Butoxyaniline | p-n-Heptoxyaniline |
| o-sec.-Butoxyaniline | o-n-Octoxyaniline |
| m-sec.-Butoxyaniline | m-n-Octoxyaniline |
| p-sec.-Butoxyaniline | p-n-Octoxyaniline |
| o-tert. Butoxyaniline | o-2-ethylhexoxyaniline |
| m-tert.-Butoxyaniline | m-2-ethylhexoxyaniline |
| p-tert.-Butoxyaniline | p-2-ethylhexoxyaniline |

Any fractionating column of conventional design providing for countercurrent liquid-vapor contact under reboiling and refluxing conditions may be employed. The column can be a packed column or it can be equipped with perforated plates or bubble cap trays. The number of theoretical plates in the column depends on efficiency of separation desired, the precise composition of the feed mixture, the quantity of solvent, the reflux ratio, and other related factors well known to those skilled in the art. Under certain conditions five theoretical plates are adequate while under more adverse conditions as high as a hundred theoretical plates may be required.

The hydrocarbon feed mixture separated in accordance with this invention consists essentially of acyclic and cyclic hydrocarbons all containing six carbon atoms. Very small amounts of other hydrocarbons can be tolerated in the mixture but such hydrocarbons should be kept to a minimum as they can interfere with the efficiency of this particular extractive distillation.

The hydrocarbon feed mixture is preferentially introduced into the fractionating column in an intermediate section. The solvent is introduced at a point above the introduction of the hydrocarbon feed mixture and preferably near the top of the column. Both solvent and hydrocarbon feed mixture are introduced continuously. The solvent feed temperature can vary substantially and is adjusted to maintain steady state conditions in the column.

The quantity of solvent required to be introduced continuously into the column in order to accomplish the desired separation can vary over rather wide limits depending upon the efficiency of separation desired. Generally at least two parts by volume of solvent for each part by volume of hydrocarbon mixture is necessary to effect any efficient degree of separation. The quantity of solvent used can be increased to as high as 10 and at times even as high as 20 volumes per volume of hydrocarbon mixture. As dilution of the internal reflux becomes infinite, separation becomes sharper but operating efficiency is lowered considerably because of the relatively small quantity of hydrocarbon feed mixture being processed as infinite reflux is approached. Too large an excess of solvent is, therefore, to be avoided.

Although generally the extractive distillation of this invention is to be carried out at about atmospheric pressure, as illustrated in the examples, it may be conducted below, or above atmospheric pressure.

The reflux ratio can be varied considerably in the proper operation of this extractive distillation process and the exact ratio will be dependent upon the operating characteristics of the column, the quanity of solvent employed and the degree of separation desired.

The cyclic hydrocarbons contained in the solvent can be recovered by any technique well known to those skilled in the art. Generally, a simple distillation is all that is required.

What is claimed is:

1. A continuous process for the separation of cyclic hydrocarbons from a hydrocarbon feed mixture consisting essentially of acyclic and cyclic hydrocarbons all containing six carbon atoms which comprises continuously introducing said feed mixture into an intermediate section of a fractioning column, introducing an alkyl ether of aniline into said fractionating column at a point above the point of introduction of said feed mixture so that said alkyl ether of aniline flows countercurrent to and intimately contacts the ascending vapors of said feed mixture, withdrawing overhead a mixture of acyclic hydrocarbons substantially free of cyclic hydrocarbons and removing from the bottom section of said column a solution of cyclic hydrocarbons contained in the alkyl ether of aniline.

2. A continuous process for the separation of cyclic hydrocarbons from a hydrocarbon feed mixture consisting essentially of acyclic and cyclic hydrocarbons all containing six carbon atoms which comprises continuously introducing said feed mixture into an intermediate section of a fractionating column, introducing an alkyl ether of aniline, wherein the alkyl group contains from 1 to 8 carbon atoms, into said fractionating column at a point above the point of introduction of said feed mixture so that said alkyl ether of aniline flows countercurrent to and intimately contacts the ascending vapors of said feed mixture, withdrawing overhead a mixture of acyclic hydrocarbons substantially free of cyclic hydrocarbons and removing from the bottom section of said column a solution of cyclic hydrocarbons contained in the alkyl ether of aniline.

3. A continuous process for the separation of cyclic hydrocarbons from a hydrocarbon feed mixture consisting essentially of acyclic and cyclic hydrocarbons all containing six carbons atoms which comprises continuously introducing said feed mixture into an intermediate section of a fractionating column, introducing an alkyl ether of aniline, wherein the alkyl group contains from 1 to 8 carbon atoms, and wherein the amount of the alkyl ether of aniline is such that a volume ratio of at least 2 parts solvent to 1 part feed is maintained, into said fractionating column at a point above the point of introduction of said feed mixture so that said alkyl ether of aniline flows countercurrent to and intimately contacts the ascending vapors of said feed mixture, withdrawing overhead a mixture of acyclic hydrocarbons substantially free of cyclic hydrocarbons and removing from the bottom section of said column a solution of cyclic hydrocarbons contained in the alkyl ether of aniline.

4. The process as described in claim 3 wherein the alkyl ether of aniline is o-ethoxyaniline.

5. The process as described in claim 3 wherein the alkyl ether of aniline is o-methoxyaniline.

6. The process as described in claim 3 wherein the alkyl ether of aniline is o-propoxyaniline.

7. The process as described in claim 3 wherein the alkyl ether of aniline is p-n-butoxyaniline.

8. The process as described in claim 3 wherein the alkyl ether of aniline is o-2-methylpentoxyaniline.

References Cited in the file of this patent

UNITED STATES PATENTS

| | | |
|---|---|---|
| 2,215,915 | Cope et al. | Sept. 24, 1940 |
| 2,243,873 | Lyman | June 3, 1941 |
| 2,246,257 | Kohn | June 17, 1941 |
| 2,325,379 | Durrum | July 27, 1943 |
| 2,343,611 | Cope et al. | Feb. 9, 1954 |
| 2,773,918 | Stephens | Dec. 11, 1956 |